(12) United States Patent
Staples

(10) Patent No.: US 7,455,339 B2
(45) Date of Patent: Nov. 25, 2008

(54) LAPTOP SAFETY CARRIER

(76) Inventor: Lawrence A. Staples, 127 E. 36th St., Wilmington, DE (US) 19802

( * ) Notice: Subject to any disclaimer, the term of this patent is extended or adjusted under 35 U.S.C. 154(b) by 0 days.

(21) Appl. No.: 11/821,280

(22) Filed: Jun. 22, 2007

(65) Prior Publication Data

US 2008/0043421 A1    Feb. 21, 2008

Related U.S. Application Data

(63) Continuation-in-part of application No. 11/483,320, filed on Jul. 7, 2006, now abandoned.

(51) Int. Cl.
*B65D 63/18* (2006.01)
*A45F 5/12* (2006.01)

(52) U.S. Cl. .................. 294/156; 294/138; 294/165

(58) Field of Classification Search ............... 294/138, 294/148, 149, 150, 151, 153, 156, 165; 150/154, 150/165
See application file for complete search history.

(56) References Cited

U.S. PATENT DOCUMENTS

| | | | | |
|---|---|---|---|---|
| 2,801,781 A | * | 8/1957 | Goetz | 294/156 |
| 3,098,315 A | * | 7/1963 | Bonon | 294/152 |
| 3,191,830 A | * | 6/1965 | Goetz | 294/156 |
| 4,055,287 A | * | 10/1977 | Champenois, Jr. | 294/141 |
| 5,251,945 A | * | 10/1993 | Stoops | 294/152 |
| 5,709,424 A | * | 1/1998 | Schuler | 294/148 |
| 6,149,001 A | * | 11/2000 | Akins | 206/320 |
| 6,749,095 B2 | * | 6/2004 | Johnson | 224/250 |
| 6,871,739 B2 | * | 3/2005 | Lopez | 206/320 |
| D510,348 S | * | 10/2005 | Kaczowka | D14/341 |

* cited by examiner

*Primary Examiner*—Dean J Kramer
(74) *Attorney, Agent, or Firm*—James Ray & Assoc.

(57) ABSTRACT

An apparatus for carrying a laptop computer. The apparatus comprises an elongated strip for wrapping around such laptop computer. Such elongated strip having a predetermined length and a predetermined width and formed of a preselected material. There is a hook and loop attachment for securing a first end of such elongated strip to another portion of the elongated strip after the elongated strip has enclosed such laptop computer. A handle member is securely attached to a second end of the elongated strip. The handle member has a slotted portion disposed closely adjacent where the handle member is securely attached to the second end of the elongated strip. The elongated strip passes through the slotted portion of the handle member as the elongated strip encircles such preselected object to be carried.

19 Claims, 6 Drawing Sheets

LAPTOP SAFETY CARRIER

CROSS-REFERENCE TO RELATED APPLICATIONS

This application is a Continuation-in-Part Application and claims priority benefits of patent application Ser. No. 11/483,320 filed Jul. 7, 2006 now abandoned. The teachings of this related application are incorporated herein by reference thereto.

FIELD OF THE INVENTION

The present invention relates, in general, to a carrier, and, more particularly, the present invention relates to a safety carrier for a laptop or notebook computer which makes it safe for carrying such computer without the need for a carrying case.

BACKGROUND OF THE INVENTION

Laptop or notebook computers are becoming increasingly more popular. Keeping a notebook computer in your hands without using the case is easy and convenient for transport but not so convenient for carrying. Unloading or loading your laptop in a storage bin can be costly if such device is dropped, slides around or comes in contact with damaging materials.

It would be advantageous and convenient if there were a means for keeping the laptop computer from slipping out of a person's hands while trying to get it in or out of a storage container and for making the laptop easy to handle and safer for carrying.

SUMMARY OF THE INVENTION

In a first aspect the invention provides for an apparatus for carrying a preselected object. The apparatus comprises a handle member having each of a first predetermined length, a first predetermined thickness and a first predetermined shape. There is a first slot like portion formed in the handle member closely adjacent one edge thereof, such first slot like portion having a first predetermined width and a second predetermined length. A second slot like portion is formed between the first slot like portion and a radially opposed outer edge of the handle member. The second slot like portion has a second predetermined width and a third predetermined length. An elongated flexible strip having a fourth predetermined length and a third predetermined width, and having a first end of the elongated flexible strip secured to the handle member through such first slot like portion, the elongated flexible strip being formed of a first predetermined material. Such elongated strip for encircling such preselected object to be carried. A securing means has a first portion thereof disposed on a first side of the elongated flexible strip closely adjacent a second end thereof and a second portion disposed on a second side of the elongated flexible strip closely adjacent the first end thereof.

In a second aspect there is provided an apparatus for carrying a preselected object. The apparatus comprises a handle member having each of a first predetermined length, a first predetermined thickness and a first predetermined shape. There is a first slot like portion formed in the handle member closely adjacent one edge thereof, such first slot like portion having a first predetermined width and a second predetermined length. A second slot like portion is formed between the first slot like portion and a radially opposed outer edge of the handle member. The second slot like portion has a second predetermined width and a third predetermined length. An elongated flexible strip having a fourth predetermined length and a third predetermined width, and having a first end of the elongated flexible strip secured to the handle member through such first slot like portion, the elongated flexible strip being formed of a first predetermined material. Such elongated strip for encircling such preselected object to be carried. A securing means has a first portion thereof disposed on a first side of the elongated flexible strip closely adjacent a second end thereof and a second portion disposed on a second side of the elongated flexible strip closely adjacent the first end thereof. A pocket member is disposed on an outer surface of the elongated flexible strip for holding preselected items.

OBJECTS OF THE INVENTION

It is, therefore, one of the primary objects of the present invention to provide a safety carrier that can be used to carry a laptop or notebook computer safely and securely.

Another object of the present invention is to provide a safety carrier that can be used to carry a laptop or notebook computer that is easy to use.

Still another object of the present invention is to provide a safety carrier that can be used to carry a laptop or notebook computer that has a convenient carrying handle.

Yet another object of the present invention is to provide a safety carrier that can be used to carry a laptop or notebook computer that does not require the use of the case.

Another object of the present invention is to provide a safety carrier that can be used to carry a laptop or notebook computer that also has a pocket disposed on the carrier for holding a PDA, cell phone, ID, pens or other useful items.

These and various other objects and advantages of this invention will become apparent after a full reading of the following detailed description, particularly, when read in conjunction with the attached drawings as described below and the appended claims.

Figure 1:
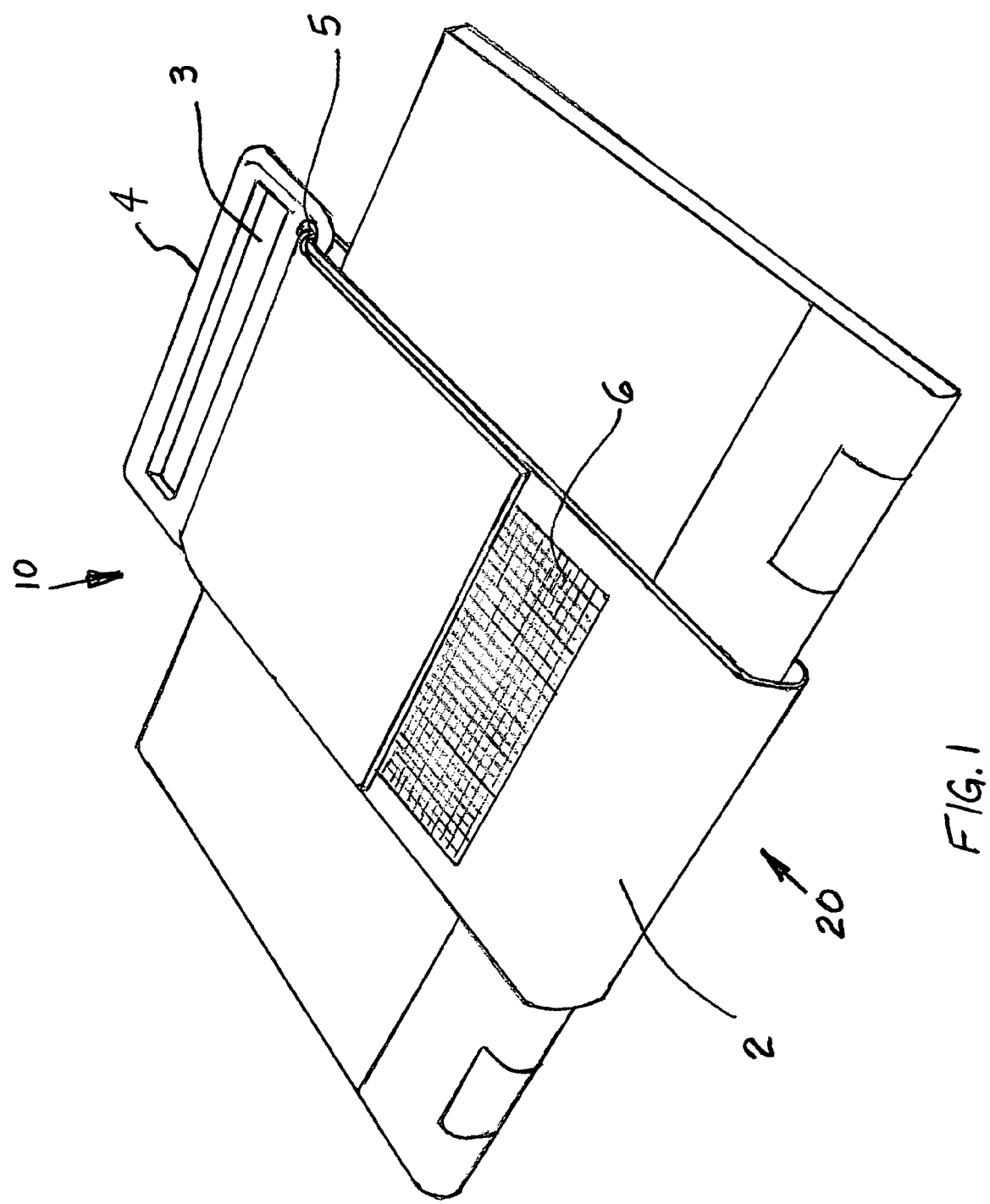
FIG. 1 is a perspective view of the apparatus according to an embodiment of the invention showing a laptop computer with the apparatus attached.
Figure 2:
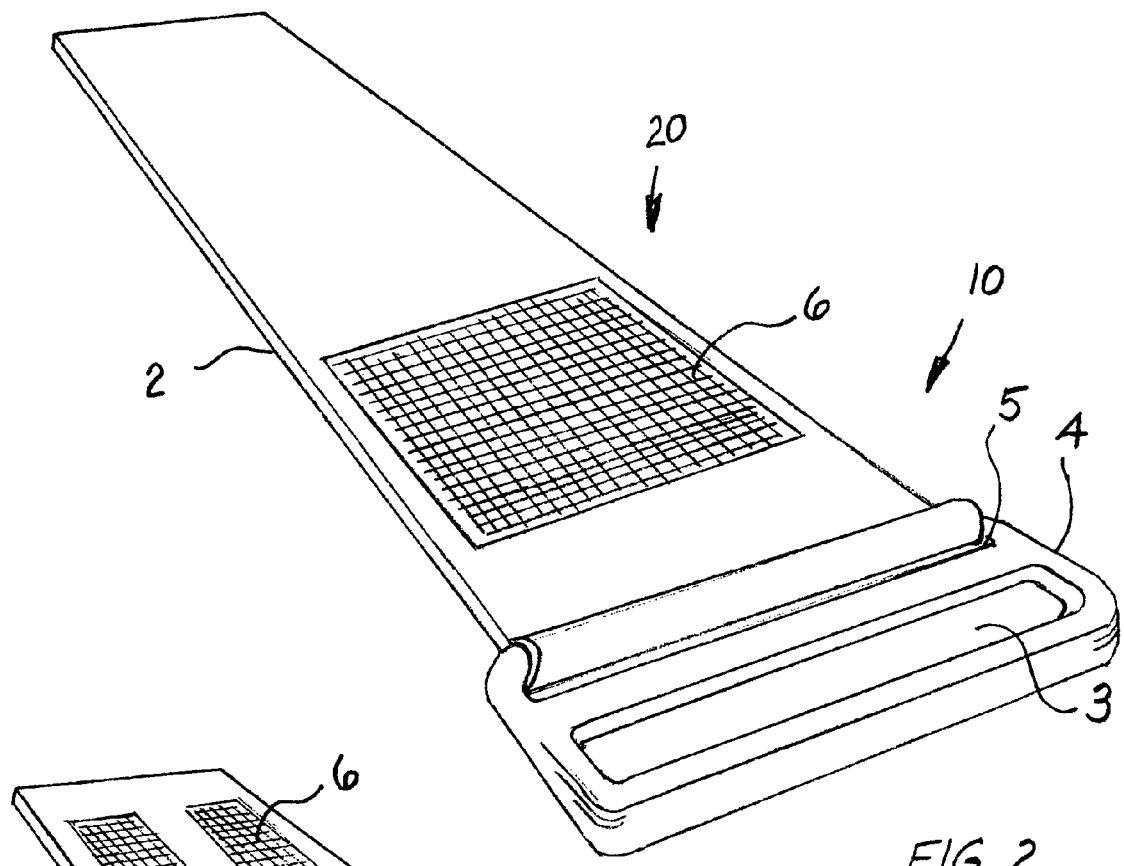
FIG. 2 is a perspective view of the top side of the apparatus.
Figure 3:
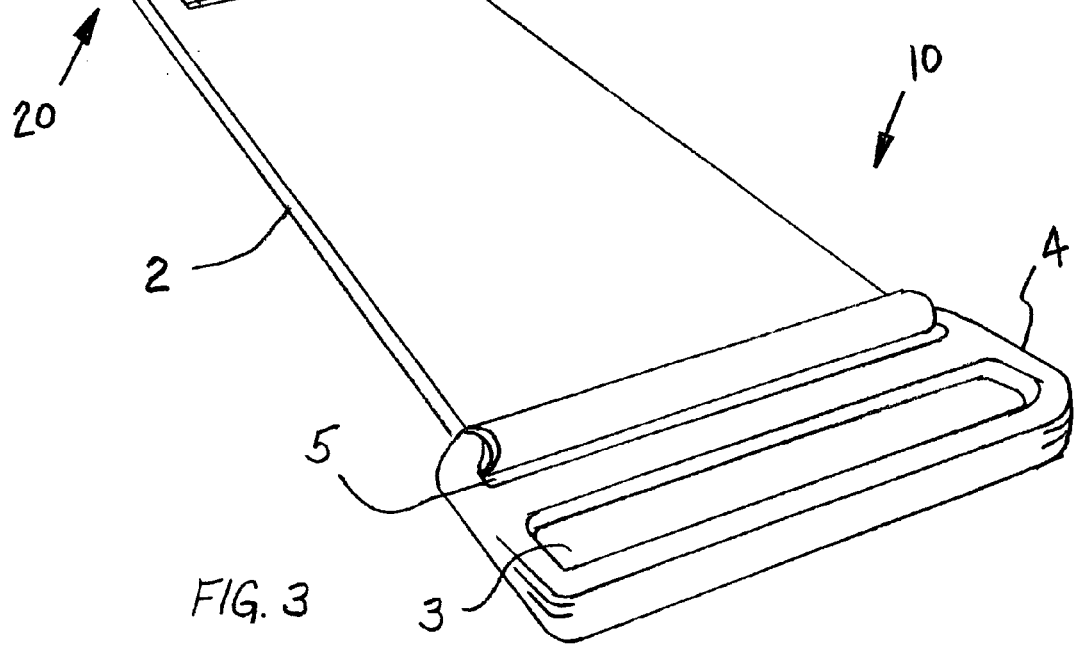
FIG. 3 is a perspective view of the underside of the apparatus.
Figure 4:
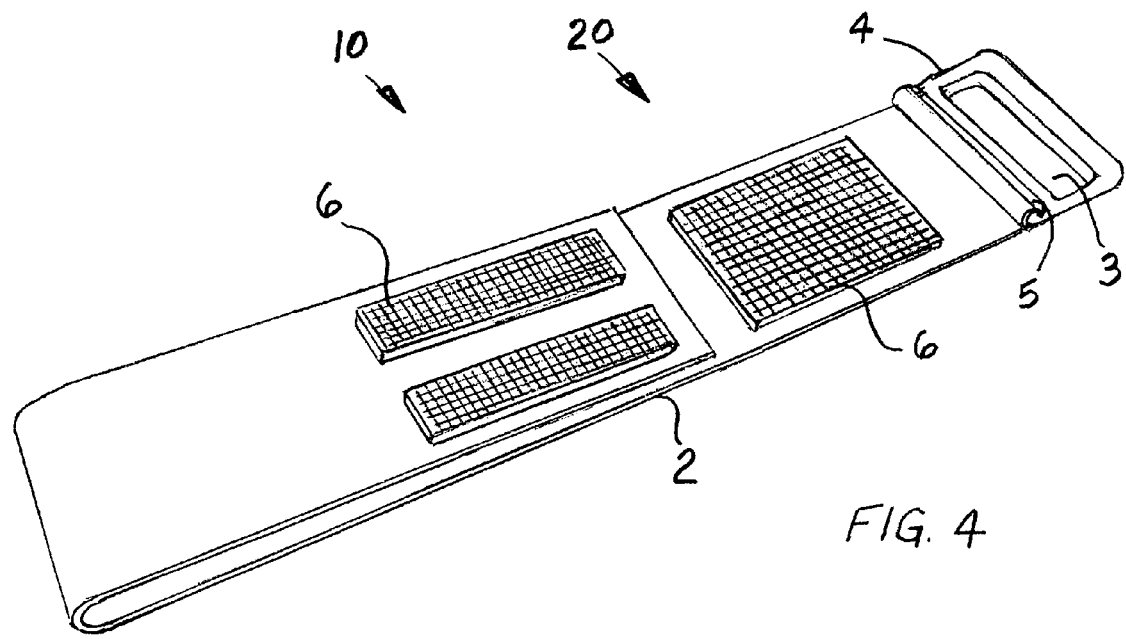
FIG. 4 is a perspective view of the apparatus with the elongated strip folded over showing the means for securing.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

In a first aspect the invention provides for an apparatus, generally designated 10, for carrying a preselected object. Such preselected object could be a laptop computer, a notebook, a binder or any other similar objects; however, the following description will refer primarily to a laptop computer since this was the basic thrust of the invention but this does not preclude the use of the apparatus for carrying other objects.

The apparatus 10 comprises a handle member 4,12 (there are two handle members shown in the drawings handle 4 is a plain handle, whereas handle 12 is designed as an ergonomic handle, but only one of the numbers will be used to simplify the description even though the handles are essentially interchangeable) having each of a first predetermined length, a first predetermined thickness and a first predetermined shape. There is a first slot like portion 5 formed in the handle member 4 closely adjacent one edge thereof, such first slot like portion 5 having a first predetermined width and a second predetermined length. A second slot like portion 3 is formed between the first slot like portion 5 and a radially opposed outer edge of the handle member 4. The second slot like portion 3 has a second predetermined width and a third predetermined length. An elongated flexible strip 2 having a fourth predetermined length and a third predetermined width, and having a first end of the elongated flexible strip 2 secured to the handle member through such first slot like portion 5, the elongated flexible strip 2 being formed of a first predetermined material. Such elongated flexible strip 2 is used for encircling such preselected object to be carried. A securing means, generally designated 20, has a first portion thereof disposed on a first side of the elongated flexible strip 2 closely adjacent a second end thereof and a second portion disposed on a second side of the elongated flexible strip 2 closely adjacent the first end thereof.

Such second end of the elongated strip 2 is secured to another portion of such elongated strip 2 by means of one of hook and loop attachments 6, snaps 8, hooks and buckles. It is presently preferred that such means for securing 20 is a hook and loop attachment 6 (Velcro). Velcro is a registered trademark of Velcro Industries B.V.

As is seen in the drawing Figures such handle member 4 is engageable with the first end of such elongated strip 2. It is presently preferred that such handle member 4 is securely attached to such first end of the elongated strip 2. It is also preferred that such first end of the elongated strip 2 pass through the slot like portion 5 of the handle member 4 as it encircles such laptop computer. This arrangement permits the elongated strip 2 to be adjusted to various lengths so as to be able to carry all lap top computers or any other preselected object.

Such predetermined width of the elongated strip 2 is between about 3.75 inches and about 5.25 inches. It is further preferred that such predetermined width of the elongated strip 2 is between about 4.25 inches and about 5 inches.

The first preselected material for such elongated strip 2 is selected from one of plastic, rubber, nylon, and synthetic leather. It is presently preferred that such first preselected material is rubber and even more preferred that rubber is a synthetic rubber and that such synthetic rubber is a thermoplastic elastomer. One such thermoplastic elastomer is Sanoprene. Sanoprene is a trade mark of Reed Rubber and Foam Products.

It is also an embodiment of the invention that such handle member 4 also be made of a second preselected material. Such second preselected material is selected from one of plastic, rubber, nylon, and synthetic leather. It is presently preferred that such handle member also be made of a thermoplastic elastomer.

Figure 5:
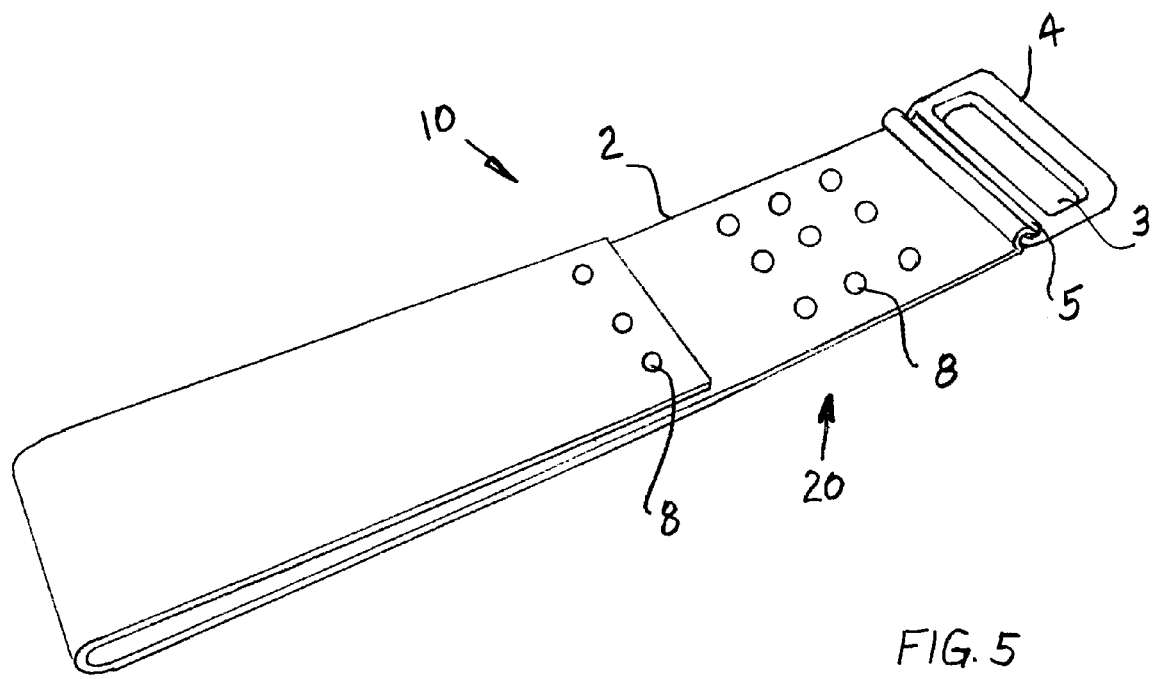
FIG. 5 is a perspective view of the apparatus according to an alternate embodiment of the invention.
Figure 6:
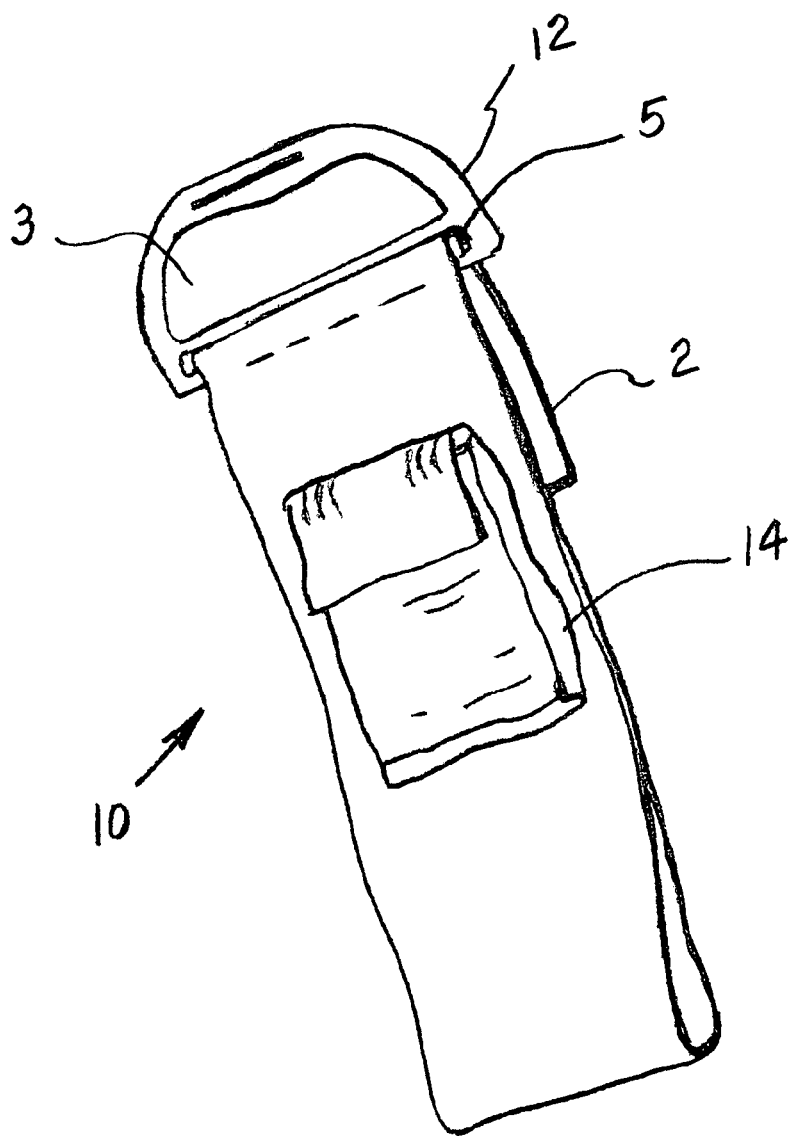
FIG. 6 is a perspective view of the apparatus having a pocket disposed thereon according to an alternate embodiment of the invention showing a laptop computer with the apparatus attached.

Another embodiment of the invention as seen in FIG. 5 provides that snaps 8, hooks or buckles may be used to secure the first end of elongated strip 2 to another portion of the elongated strip 2.

Figure 8:
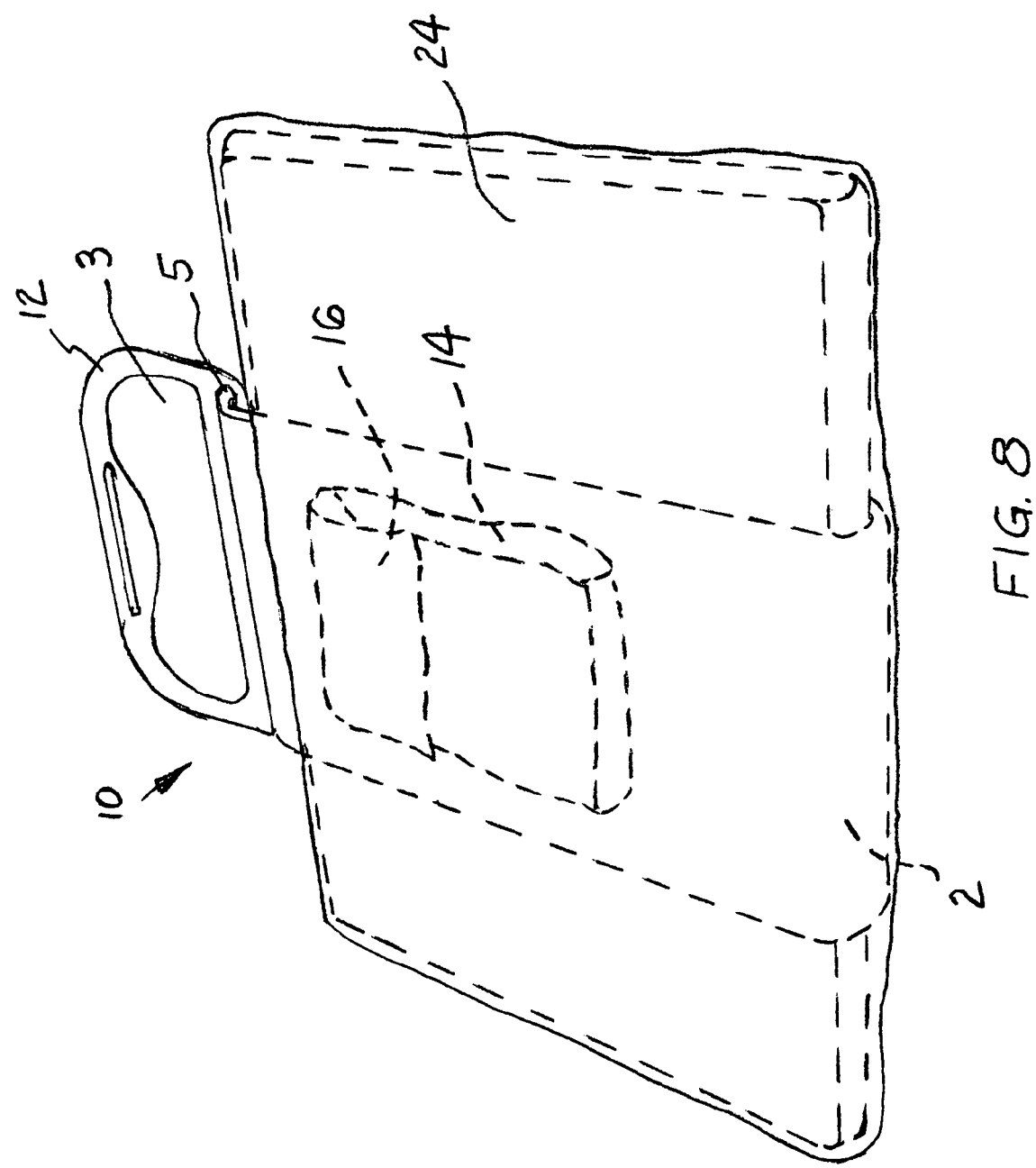
FIG. 8 is a perspective view of the apparatus having a weather proof cover in place according to an alternate embodiment.

Yet, another embodiment of the invention provides for a weather proof cover to protect the laptop computer. One such weather proof arrangement, as seen in FIG. 8, includes a weather proof cover 24 which fits over such laptop computer with the apparatus 10 attached to such laptop computer leaving the handle member 4 free so as to protect such computer from rain and other weather elements.

Figure 7:
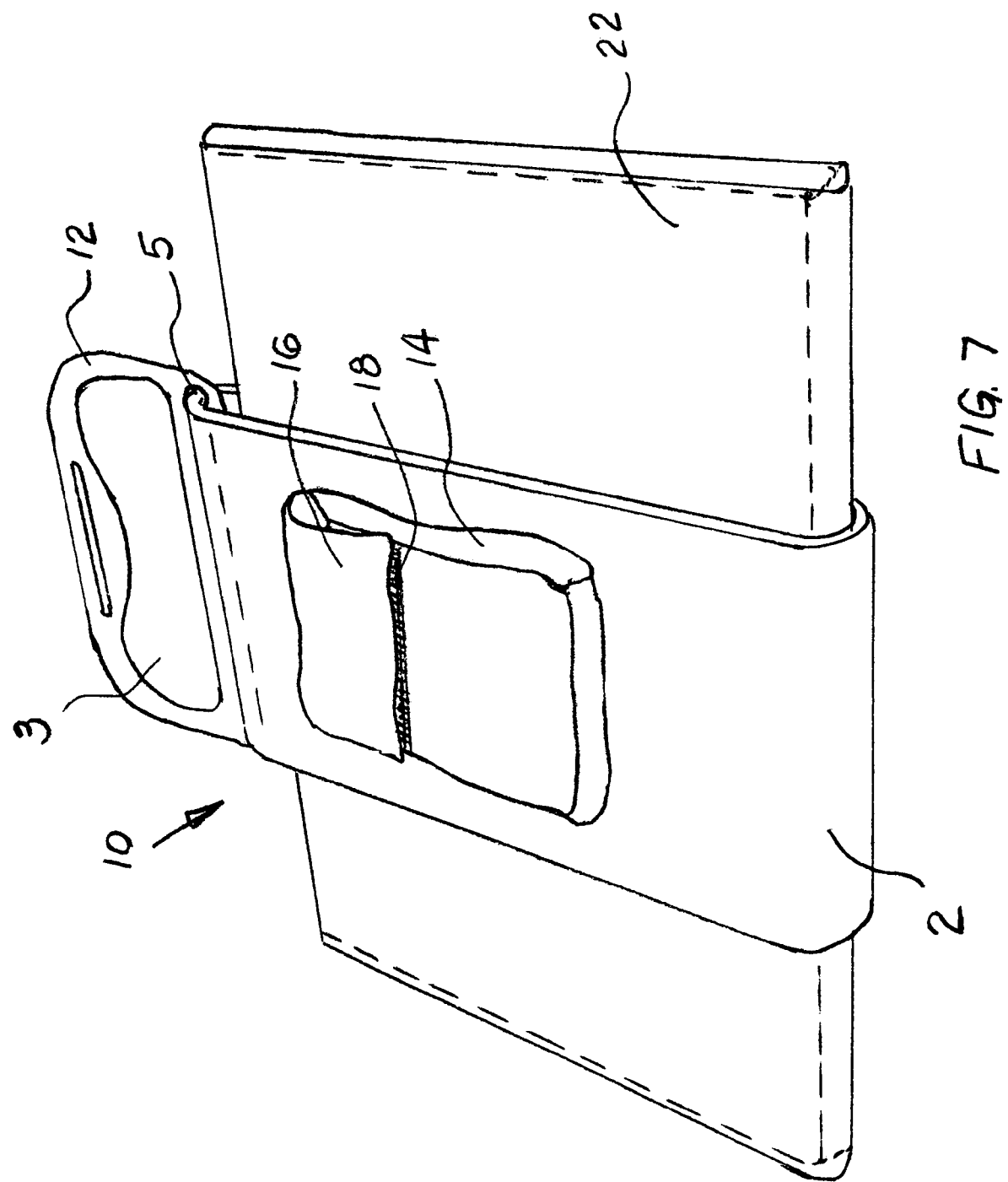
FIG. 7 is a perspective view of the apparatus having a weather proof cover in place according to one embodiment of the invention.

FIG. 7 shows a different weather proof arrangement. In this case the weather proof cover 22 is open at the bottom and just slips over the laptop computer and the apparatus 10 fits over the top of the weather proof cover 22.

It is within the scope of the invention that such apparatus 10 can be provided in a variety of colors, styles and designs to meet everyone's tastes. Also, as stated previously, there is an all weather cover, made of soft durable material, that can fit over the apparatus with the laptop secured therein which can protect the laptop against a variety of weather elements.

In a second aspect there is provided an apparatus 10 for carrying a preselected object. The apparatus comprises a handle member 12 having each of a first predetermined length, a first predetermined thickness and a first predetermined shape. There is a first slot like portion 5 formed in the handle member closely adjacent one edge thereof, such first slot like portion 5 having a first predetermined width and a second predetermined length. A second slot like portion 3 is formed between the first slot like portion 5 and a radially opposed outer edge of the handle member 4. The second slot like portion 5 has a second predetermined width and a third predetermined length. An elongated flexible strip 2 having a fourth predetermined length and a third predetermined width, has a first end of the elongated flexible strip 2 secured to the handle member 4 through such first slot like portion 5, the elongated flexible strip 2 being formed of a first predetermined material. Such elongated strip 2 for encircling such preselected object to be carried. A securing means 20 has a first portion thereof disposed on a first side of the elongated flexible strip 2 closely adjacent a second end thereof and a second portion disposed on a second side of the elongated flexible strip 2 closely adjacent the first end thereof. A pocket member 14 is disposed on an outer surface of the elongated flexible strip 2 for holding preselected items.

Such pocket member 14 also includes a flap portion 16 that closes and is secured by means of hook and loop arrangement 18 so that the items stored in the pocket member such as a cell phone are secured.

It should be noted that such handle member 12 is ergonomically designed to provide comfort for the hand as the apparatus 10 is carrying a preselected object such as a laptop computer.

Such preselected items that can be stored in the pocket 14 can be selected from at least one of a PDA (personal digital assistant), cell phone, identification means, pen, or tickets (such as airline tickets).

Such preselected objects could include at least one of a laptop computer, books, and binders. However, the prime intent of the invention is as a means for carrying a laptop computer safely and easily.

Thus, the present invention provides a laptop carrier member with a handle which will keep the laptop from slipping out of the user's hands and makes the laptop easy to handle and safer for carrying without the need of the case for the laptop computer.

Further, it should be noted that with the arrangement of the Velcro on the elongated flexible member 2 that with the elongated flexible strip 2 passing through said first slot like member 5 in said handle member 4 and securing the end of the flexible member 2 to the Velcro the apparatus 10 is adjustable so as to be able to fit all laptop computers or other selected objects.

The apparatus 10 is easy to use. One only has to encircle the laptop computer with the elongated strap 2, pull the elongated strap 2 through the slot 5 in the handle, pull the strap 2 tight, secure it in place with the Velcro and you are ready to go.

While a presently preferred embodiment and alternate embodiments of the present invention has been described in detail above, it should be understood that various other adaptations and/or modifications of the invention can be made by those persons who are particularly skilled in the art without departing from either the spirit of the invention or the scope of the appended claims.

I claim:

1. An apparatus for carrying a preselected object, said apparatus comprising:
    (a) a handle member having each of a first predetermined length, a first predetermined thickness and a first predetermined shape;
    (b) a first slot like portion formed in said handle member closely adjacent one edge thereof, said first slot like portion having a first predetermined width and a second predetermined length;
    (c) a second slot like portion formed between said first slot like portion and a radially opposed outer edge of said handle member, said second slot like portion having a second predetermined width and a third predetermined length;
    (d) an elongated flexible strip having a fourth predetermined length and a third predetermined width, a first end of said elongated flexible strip secured to said handle member through said first slot like portion, said elongated flexible strip being formed of a first predetermined material, a second end of said elongated flexible strip encircles such preselected object and passes through said first slot like portion of said handle member; and
    (e) a securing means having a first portion thereof disposed on a first side of said elongated flexible strip closely adjacent a second end thereof and a second portion disposed on a second side of said elongated flexible strip closely adjacent said first end thereof.

2. The apparatus, according to claim 1, wherein said first portion of said securing means disposed on said first side closely adjacent said second end of said elongated flexible strip is secured to said second portion of said securing means disposed on said second side of said elongated flexible strip closely adjacent a first end thereof after said elongated flexible member has encircled such preselected object to be carried.

3. The apparatus, according to claim 1, wherein said securing means includes one of hook and loop attachments, snaps, hooks and buckles.

4. The apparatus, according to claim 3, wherein said securing means is hook and loop attachments.

5. The apparatus, according to claim 1, wherein said handle member is made of a second predetermined material.

6. The apparatus, according to claim 5, wherein said second predetermined material is selected from one of plastic, rubber, nylon, and synthetic leather.

7. The apparatus, according to claim 6, wherein said second predetermined material is a thermoplastic elastomer.

8. The apparatus, according to claim 6, wherein said third predetermined width of said elongated strip is between about 4.25 inches and about 5 inches.

9. The apparatus, according to claim 1, wherein said third predetermined width of said elongated strip is between about 3.75 inches and about 5.25 inches.

10. The apparatus, according to claim 1, wherein said first preselected material is selected from one of plastic, rubber, nylon, and synthetic leather.

11. The apparatus, according to claim 10, wherein said rubber is a synthetic rubber.

12. The apparatus, according to claim 11, wherein said synthetic rubber is a thermoplastic elastomer.

13. The apparatus, according to claim 1, wherein said apparatus further includes a weather proof cover which fits over a laptop computer with said apparatus attached to such laptop computer, leaving said handle member uncovered, so as to protect such computer from rain and other weather elements.

14. The apparatus, according to claim 1, wherein said apparatus further includes a weather proof cover which fits over a laptop computer and said apparatus fits over said waterproof cover so as to protect such laptop computer from rain and other weather elements.

15. An apparatus for carrying a preselected object, said apparatus comprising:
    (a) a handle member having each of a first predetermined length, a first predetermined thickness and a first predetermined shape;
    (b) a first slot like portion formed in said handle member closely adjacent one edge thereof, said first slot like portion having a first predetermined width and a second predetermined length;
    (c) a second slot like portion formed between said first slot like portion and a radially opposed outer edge of said handle member, said second slot like portion having a second predetermined width and a third predetermined length;
    (d) an elongated flexible strip having a fourth predetermined length and a third predetermined width, a first end of said elongated flexible strip secured to said handle member through said first slot like portion, said elongated flexible strip being formed of a first predetermined material, a second end of said elongated flexible strip encircles such preselected object and passes through said first slot like portion of said handle member;
    (e) a securing means having a first portion thereof disposed on a first side of said elongated flexible strip closely adjacent a second end thereof and a second portion disposed on a second side of said elongated flexible strip closely adjacent said first end thereof; and
    (f) a pocket member disposed on an outer surface of said elongated flexible strip for holding preselected items.

16. The apparatus, according to claim 15, wherein said preselected items includes at least one of a personal digital assistant, cell phone, identification means, pen, and tickets.

17. The apparatus, according to claim 15, wherein said preselected object include at least one of a laptop computer, books, and binders.

18. The apparatus, according to claim 17, wherein said elongated flexible strip passing through said first slot like member in said handle member is adjustable so as to be able to fit all laptop computers.

19. The apparatus, according to claim 15, wherein said pocket member includes a flap for closing said pocket member so as to secure such preselected items stored inside said pocket member.

* * * * *